United States Patent [19]

Sawano

[11] 4,349,836
[45] Sep. 14, 1982

[54] APPARATUS FOR DISPLAYING INFORMATION

[75] Inventor: Yukio Sawano, Asaka, Japan

[73] Assignee: Fuji Photo Film Co., Ltd., Japan

[21] Appl. No.: 855,626

[22] Filed: Nov. 29, 1977

Related U.S. Application Data

[63] Continuation of Ser. No. 641,493, Dec. 17, 1975, abandoned.

[30] Foreign Application Priority Data

Dec. 19, 1974 [JP] Japan .................................. 49-146089

[51] Int. Cl.$^3$ ...................... G03B 23/08; G03B 21/00; H04N 7/18
[52] U.S. Cl. .................................. 358/93; 353/27 R; 353/31; 353/35; 353/122
[58] Field of Search ...................... 353/31, 35, 84, 122, 353/27 R; 358/6, 93, 102, 1, 76, 50

[56] References Cited

U.S. PATENT DOCUMENTS

| 2,607,845 | 8/1952 | Clark | 358/6 |
| 3,319,518 | 5/1967 | Carlson | 353/27 |
| 3,379,095 | 4/1968 | Kaprelian | 353/19 |

Primary Examiner—Steven L. Stephan

[57] ABSTRACT

Two microfiches carrying information recorded in different colors which can be detected independently of each other by means of color separation optical system are superposed in the direction of the optical axis of a projection optical system. The two kinds of information recorded in different colors on the two microfiches are separately displayed on a single or two display devices through color separation optical system such as color filters or a dichroic filter. When the two kinds of information are displayed on a single display device, the information is changed over by changing over the color separation system. When the two kinds of information are displayed on two display devices, they are displayed simultaneously.

2 Claims, 3 Drawing Figures

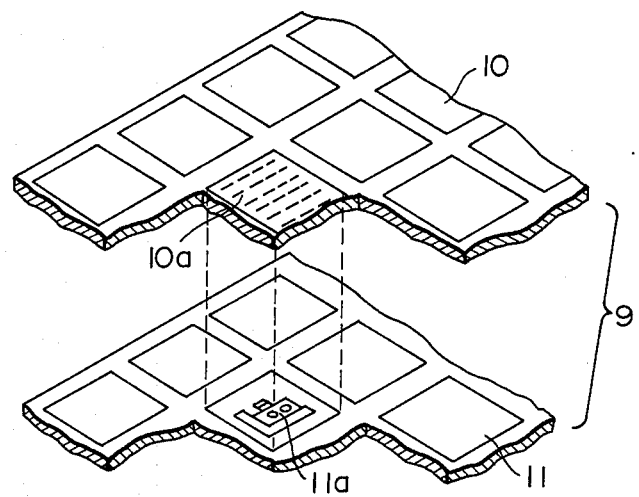
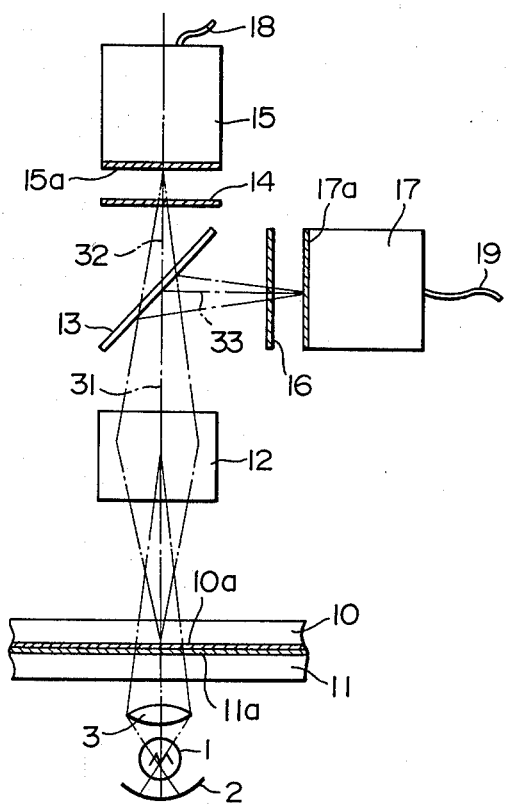

APPARATUS FOR DISPLAYING INFORMATION

This is a continuation of application Ser. No. 641,493, filed Dec. 17, 1975, now abandoned.

BACKGROUND OF THE INVENTION

1. Field of the Invention

This invention relates to an image information display apparatus, and more particularly to an apparatus for displaying several kinds of information related to each other in a plurality of display devices simultaneously.

2. Description of the Prior Art

In a microfilm system in which optical information such as characters, figures and the like is recorded on photographic recording materials in reduced scale, it is desirable that the information can be quickly retrieved and related several kinds of information can be displayed simultaneously or the display thereof can be quickly changed over.

One method of quickly changing over the display of related several kinds of information in a microfilm retrieval system is disclosed in Japanese patent publication No. 45-30306/70. In this method, two microfilms are arranged along the optical axis of a projection lens system of a microfilm projector. The two microfilms have related information and spaced apart from each other along the optical axis by the distance longer than the focal depth of the projection lens system, so that the image of only one of the films may be projected through the projection lens system. By quickly moving the projection lens along the optical axis thereof, the image projected therethrough is changed over.

Further, it is also known that two microfilms are arranged in an optical axis of a first projection lens system to be illuminated by the light of a light source and spaced apart from each other by the distance longer than the focal depth of the first projection lens system so that the image of one film may be projected therethrough, and a beam splitter is provided in the optical path to divide the light from the light source and a second projection lens system is provided in the optical path of the divided light to project the image of the other film therethrough.

The above described conventional method is disadvantageous in that the intensity of the illumination light for one film located within the focus of one projection lens system is reduced by the image of the other film located out of focus thereof. This results in undesirable uneven illumination on the projection screen. Particularly, in case that the film located out of focus has an image including bold characters, the image of the other film projected on the screen is markedly degraded by the shade thereof.

SUMMARY OF THE INVENTION

The primary object of the present invention is to provide an apparatus for simultaneously displaying several kinds of information in several display devices in which aforesaid defects inherent in the conventional methods are eliminated.

Another object of the present invention is to provide an apparatus for quickly changing over the display of several kinds of information from one kind to another in one display device in which aforesaid defects are eliminated.

Still another object of the present invention is to provide an apparatus for changing over the display of several kinds of information related to each other from one kind to anotherwithout any mechanical operation.

A further object of the present invention is to provide an apparatus for displaying several kinds of information on several display devices with high resolution and clearness.

A still further object of the present invention is to provide an apparatus for selectively displaying one kind of information among several kinds of information carried on several microfilms superposed in the direction of the optical axis of a projection lens system, whereby the capacity of information per unit area is multiplied.

The display apparatus in accordance with the present invention employs a plurality of information recording media in which the image of information is recorded in different colors. The plurality of information recording media such as microfilm sheets are superposed in the direction of the optical axis of the projection optical system. The superposed film sheets are illuminated by light passing therethrough along said optical axis and the light passing therethrough is separated in accordance with the spectral characteristic thereof into several light beams having different spectra. The separated light beams are detected by different detectors and converted separately to image signals to be transmitted to different display devices so as to be displayed thereby simultaneously or to a single display device so as to be alternately displayed thereby.

The plurality of information recording media carry images of different spectral characteristics so that the images may be separately detected through color separation optical means. The images of different spectral characteristics must be separately detected. Therefore, cyan, magenta and yellow can be employed as the color for the images carried by the different recording media. The recording media may have common information which is detected by all detectors. Such information is recorded in a color which is detected by all detectors, such as black. The frame of the image on every recording medium can be such common information.

As the color separating optical means mentioned above, can be employed general optical filters such as monochromatic filters. Dichroic filters or mirrors can also be employed as the color separating optical means.

BRIEF DESCRIPTION OF THE DRAWING

FIG. 2 is a fragmentary perspective view showing the image carrying media employed in the apparatus in accordance with an embodiment of the present invention, and FIG. 3 is a side elevational view showing the optical system employed in the display system embodying the apparatus in accordance with the present invention.

DESCRIPTION OF THE PREFERRED EMBODIMENT

Figure 1:
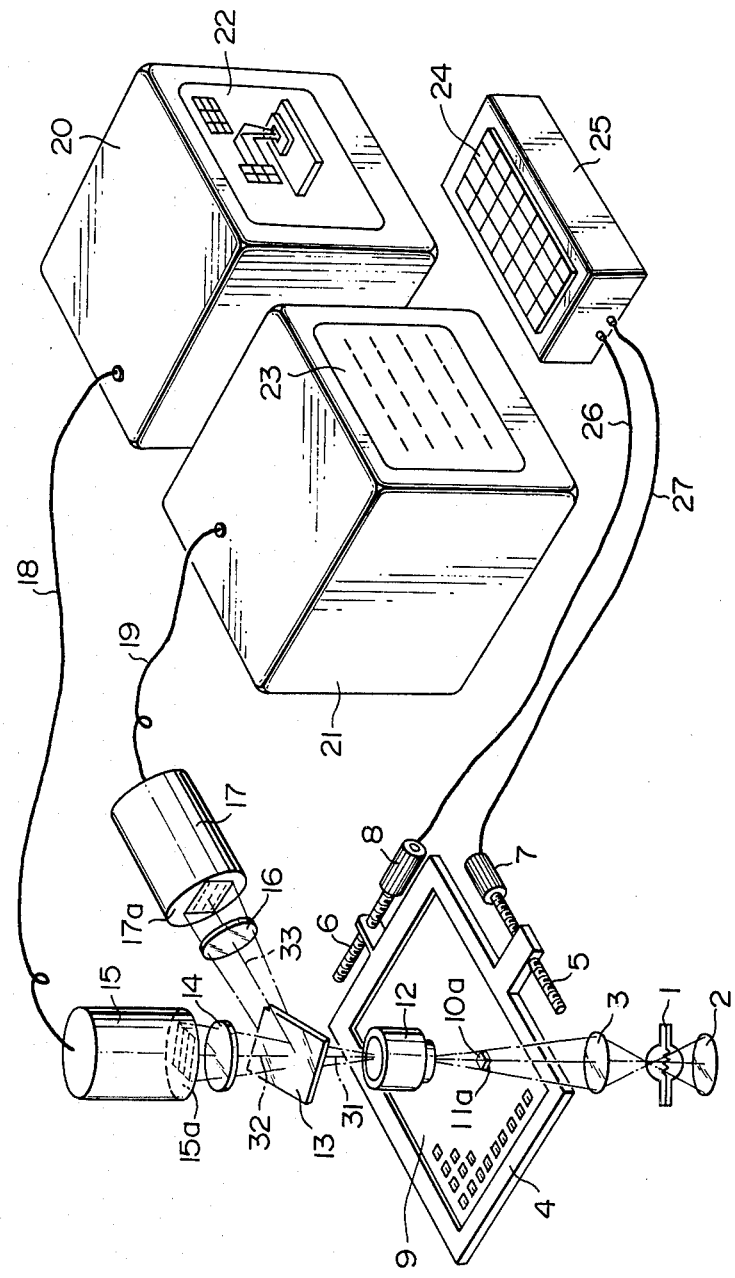
FIG. 1 is a perspective view schematically showing an information display system embodying the apparatus in accordance with the present invention.

Now a preferred embodiment of the present invention will hereinbelow described in detail with reference to FIGS. 1 to 3. A light source 1 and a concave mirror 2 are provided for illuminating a part of an image plate 9 supported by a support frame 4 through a condenser lens 3. The image plate 9 carries a number of image frames one of which is designated by 10a and 11a. The support frame 4 is engaged with a pair of feed means each comprising a feed screw 5, 6 and a pulse motor 7, 8 so as to be horizontally slid in X and Y directions.

The image plate 9 is composed of two information recording media such as microfiche having different spectral characteristics. For example, as shown in FIG. 2, the image plate 9 is composed of two microfiches 10 and 11 each having a number of image frames. An image frame 10a of one microfiche 10 and an image frame 11a of the other microfiche 11 are superposed in the direction of the optical axis of the projection optical system including said light source 1 and the condenser lens 3. The image frame 10a carries an image of magenta in color and the image frame 11a carries an image of cyan in color.

The superposed images of the image frames 10a and 11a are projected through a projection lens 12 located thereabove onto photoelectric faces 15a and 17a of image pick-up tubes 15 and 17 through color filters 14 and 16 by way of a translucent mirror 13 serving as a beam splitter. The translucent mirror 13 divides the light 31 from the projection lens 12 into first light 32 and second light 33. The first light 32 impinges on the face 15a of the tube 15 through a green filter 14 which passes only the light of the wavelength of about 530 mm. The second light 33 impinges on the face 17a of the tube 17 through a red filter 16 which passes only the light of the wavelength of about 630 nm. The first light 32 carrying information of both the image frames 10a and 11a is filtered through the green filter 14 and only the information carried by the image frame 10a of magenta is detected by the tube 15. The second light 33 carrying information of both the image frames 10a and 11a is filtered through the red filter 16 and only the information carried by the image frame 11a of cyan is detected by the tube 17. Although the image of the image frame 11a is inverted with respect to the image of the image frame 10a since the microfiche 11 is oppositely superposed with the microfiche 10, the image detected by the image pick-up tube 17 is not inverted with respect to the image detected by the other image pick-up tube 15 since the second light 33 is reflected by the mirror 13 and inverted thereby.

The images formed on the faces 15a and 17a of the image pick-up tubes 15 and 17 are converted to image signals and sent to display devices 20 and 21 by way of cables 18 and 19. The display devices 20 and 21 include cathode ray tubes 22 and 23, respectively. Thus, the images of the image frames 10a and 11a can be displayed on the cathode ray tubes 22 and 23, simultaneously.

An information retrieval device 25 carrying a key board 24 is connected with said pulse motors 7 and 8 by way of cables 26 and 27. The key board 24 is composed a number of keys for input of alphabets, numerals etc. to transmit an input signal to the pulse motors 7 and 8 so as to bring a desired image frame of the image plate 9 to the optical axis of the projection optical system.

In the preferred embodiment shown in the drawing, the size of the microfiche 10 and 11 is 4"×6" and 1500 pages of A4 size book are recorded therein with the reduction ratio of 1/100. The image frames in one microfiche 10 are all aligned with the image frames in the other microfiche 11. In the image frame 10a of one microfiche 10 is recorded information related to the information recorded in the image frame 11a of the other microfiche 11 aligned therewith. The focal length of the projection lens 12 is about 6.5 mm and the focal depth thereof is about ±3 microns. Since the focal depth is extremely small, the image bearing layer of one microfiche 10 must be in contact with the image bearing layer of the other microfiche 11. The thickness of the emulsion layer of the microfiche is about 3-5 microns, and accordingly, the images in both the microfiches 10 and 11 can be projected with sufficient sharpness by adjusting the focus of the projection lens system at the contact plane of the two microfiches 10 and 11.

When the apparatus in accordance with the present invention is applied to an ordinary microfilm projection system wherein a film having images reduced with reduction ratio of about 1/20, the two microfiches may not be put in contact with each other since the focal depth of the projection lens system for the ordinary microfilm projection system is not so small as that of the supermicrofilm projection system as described hereinbefore. Therefore, it becomes unnecessary in this case to oppositely locate the two microfiches and, therefore, it becomes possible to simply project the two kinds of information carried on the two microfiches on a single image pick-up tube without using a translucent mirror. In this case, two kinds of color filters are selectively put into the optical path of the projection optical system to selectively project the image of different color on the single image pick-up tube. In this case, therefore, two kinds of information related to each other can quickly be changed over on the display device by changing over the color of the filter.

Further, it will be readily be understood by those skilled in the art that the images on the oppositely located two microfiches can be displayed through a single display unit comprising an image pick-up tube and a cathode ray tube without using an optical mirror by simply changing over the polarity of voltage applied across a deflecting coil in the cathode ray tube in synchronization with the change-over of the color filter.

It will also be understood that the same effect could be obtained by substituting a dichroic mirror for the translucent mirror 13 and two color filters 14 and 16. Further, it will be noted that the projection optical system can be eliminated by directly taking a picture of the microfilm with the image pick-up tube. By using the image pick-up tubes to directly taking the picture of the microfilm, the contrast and brightness of image can easily be changed by means of electric signal treating circuitry.

As the example of the information to be displayed in accordance with the display method of this invention, can be considered a variety of documentary information, business information and so forth. For example, a patent specification and drawings could conveniently displayed by this method with the specification displayed by one display device 23 and the drawing illustrating the invention described by the specification displayed by the other display device 22. In this case, for example, the title of the invention or the patent number of the specification may be put into the retrieval system by the key board 24.

I claim:
1. An apparatus for displaying a plurality of kinds of related information simultaneously comprising:
a plurality of superposed information carrying media having different kinds of visible information related to each other recorded separately thereon in different colors to be detected independently of each other,
illuminating means provided on one side of the information carrying media for illuminating said media, a plurality of image pick up tubes provided on the other side of the media, projecting means disposed between the media and the pick up tubes for projecting superposed images of the information carried by the media simultaneously onto all the image pick up tubes, said projecting means comprises a single projection lens and an image separating means disposed between the projection lens and the plurality of image pick up tubes for separating light from the projection lens and projecting images separately on the tubes, a color separating means provided between the projecting means and the respective image pick up tubes for separately projecting the images of different color onto the image pick up tubes, and a plurality of display devices connected with the image pick up tubes respectively for simultaneously displaying said plurality of kinds of related information.

2. An apparatus as defined in claim 1 wherein said image separating means is a beam splitter.

* * * * *